UNITED STATES PATENT OFFICE.

ALBERT L. CLAPP, OF MARBLEHEAD, MASSACHUSETTS.

GLASS-TREATING FABRIC AND EMULSION.

1,411,409. Specification of Letters Patent. Patented Apr. 4, 1922.

No Drawing. Application filed March 2, 1920. Serial No. 362,816.

*To all whom it may concern:*

Be it known that I, ALBERT L. CLAPP, a citizen of the United States, residing at Marblehead, in the county of Essex and State of Massachusetts, have invented new and useful Improvements in Glass-Treating Fabric and Emulsion, of which the following is a specification.

The object of this invention is to provide a material which may be utilized in treating glass so that it will not become clouded with condensed moisture.

In my copending application Serial No. 328,080, filed October 2, 1919, I have described a book or packet containing detachable leaves which are treated with glycerine or its equivalent, so that the leaves may be detached and used for rubbing the glazed portion of a windshield, or eye glasses, window panes and the like, so as to prevent them from being covered with condensed moisture.

The present invention consists of a new composition which may be used for treating such detachable leaves or any other suitable fibrous material. The composition consists of an emulsion of glycerine and kerosene together with an emulsifying agent, such for example as soap. I employ, for example, 50 parts by weight of glycerine, 48 parts by weight of kerosene, and 2 parts by weight of a suitable soap, preferably elaine or an oleic acid soap. The soap is worked into a thin pasty condition by mixing and agitating it with water. The glycerine, the kerosene and the emulsifying agent are placed in a suitable container, and agitated until a thin emulsion results with a viscosity of about 10° Baumé.

In producing leaves for a packet, such as described in my said application, I use a soft rag paper of a caliper of about .030. The paper in a sheet is run slowly through a bath of the emulsion so that it absorbs the emulsion in about the proportions of 15 pounds of the emulsion to a ream of paper. The sheet is non-sticky and may be wound into a roll previous to its being cut into leaves of the proper dimension. Of course, instead of using paper, any other fibrous material may be impregnated or saturated with the emulsion.

A sheet of paper or other material, thus impregnated with the emulsion, is efficacious in treating glass to prevent the surface from being clouded with rain or condensed moisture. In rubbing the surface of the glass with the fibrous material, the kerosene removes oil, grease and dirt, and a thin film of the emulsion remains upon the glass.

What I claim is:—

1. A wiper for glass comprising a sheet of fibrous material impregnated with an emulsion of kerosene, glycerine and an emulsifying agent.

2. A wiper for glass comprising a sheet of fibrous material impregnated with an emulsion of kerosene, glycerine and soap.

3. A thin liquid emulsion for treating fibrous materials to render them adaptable for use for treating glass surfaces, consisting of kerosene and glycerine in approximately equal proportions and a small percentage of an emulsifying agent.

4. An emulsion for treating fibrous materials to render them adaptable for use for treating glass surfaces, consisting of glycerine about 50 parts, kerosene about 48 parts and soap 2 parts by weight.

In testimony whereof I have affixed my signature.

ALBERT L. CLAPP.